(12) United States Patent
Kouno

(10) Patent No.: US 8,473,141 B2
(45) Date of Patent: Jun. 25, 2013

(54) ROBOT SYSTEM

(75) Inventor: Dai Kouno, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 785 days.

(21) Appl. No.: 12/550,402

(22) Filed: Aug. 31, 2009

(65) Prior Publication Data

US 2010/0152944 A1  Jun. 17, 2010

(30) Foreign Application Priority Data

Dec. 11, 2008 (JP) ................................. 2008-315744
Dec. 11, 2008 (JP) ................................. 2008-315745
Dec. 18, 2008 (JP) ................................. 2008-321981

(51) Int. Cl.
*G01C 22/00* (2006.01)
*G01C 21/00* (2006.01)

(52) U.S. Cl.
USPC ............... 701/23; 701/26; 701/523; 701/514; 701/408

(58) Field of Classification Search
None
See application file for complete search history.

(56) References Cited

U.S. PATENT DOCUMENTS

| | | | | |
|---|---|---|---|---|
| 5,051,906 A | * | 9/1991 | Evans et al. ................... | 701/28 |
| 5,170,352 A | * | 12/1992 | McTamaney et al. .......... | 701/26 |
| 7,053,580 B2 | * | 5/2006 | Aldred .......................... | 318/580 |
| 2002/0091466 A1 | * | 7/2002 | Song et al. .................... | 700/245 |

FOREIGN PATENT DOCUMENTS

| | | |
|---|---|---|
| JP | 04-333903 | 11/1992 |
| JP | 07-191744 | 7/1995 |
| JP | 2006-079325 | 3/2006 |
| JP | 2006-126974 | 5/2006 |
| JP | 2006-293975 | 10/2006 |
| JP | 2008-028614 | 2/2008 |
| JP | 2008-052669 | 3/2008 |
| JP | 2008-067617 | 3/2008 |
| JP | 2008-146197 | 6/2008 |

OTHER PUBLICATIONS

Japanese Office Action for corresponding JP Application No. 2008-315744, Jan. 11, 2012.
Japanese Office Action for corresponding JP Application No. 2008-315745, Jan. 11, 2012.
Japanese Office Action for corresponding JP Application No. 2008-321981, Jan. 12, 2012.

* cited by examiner

*Primary Examiner* — Thomas Tarcza
*Assistant Examiner* — Adam Tissot
(74) *Attorney, Agent, or Firm* — Ditthavong Mori & Steiner, P.C.

(57) ABSTRACT

A robot system includes camera, a distance direction sensor and a controller. The controller is configured to store a plurality of instruction images obtained as a target of the real-time image at each of a plurality of discrete instruction points provided on a predetermined running path. The controller is configured to switch, on the basis of predetermined switching conditions, between an image guidance mode in which the controller controls a running subsystem on the basis of a comparison result between the real-time image and the instruction image, and a measurement distance guidance mode in which the controller controls the running subsystem on the basis of a detection result of the distance direction sensor.

12 Claims, 15 Drawing Sheets

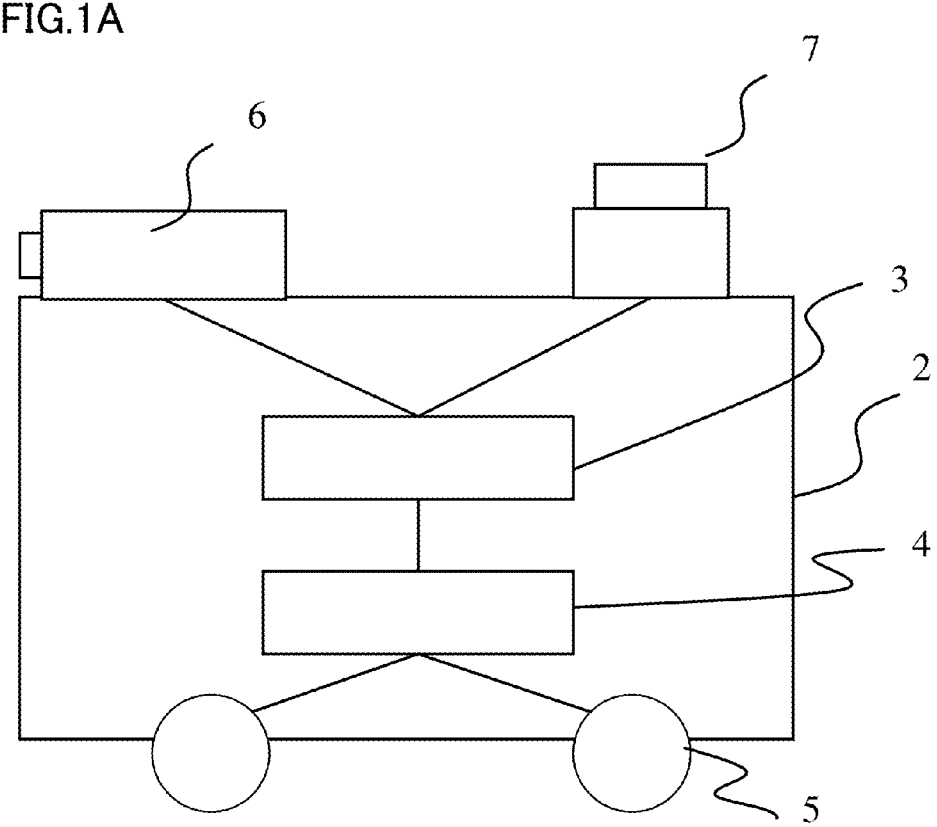

ROBOT SYSTEM

CROSS REFERENCES TO RELATED APPLICATIONS

The present application relates to Japanese Patent Application No. 2008-315744, filed Dec. 11, 2008, entitled "Robot", and to Japanese Patent Application No. 2008-315745, filed Dec. 11, 2008, entitled "Robot System" and Japanese Patent Application No. 2008-321981, filed Dec. 18, 2008, entitled "Robot and Robot System" all of which are incorporated herein by reference in their entirety.

BACKGROUND OF THE INVENTION

1. Field of the Invention

The present invention relates to a robot system having a running subsystem.

2. Description of the Related Art

In production plants, robots which are configured to run autonomously to carry products or materials are used in order to save labor (e.g., see Japanese Patent Laid-Open Publication No. 2006-293975, Japanese Patent Laid-Open Publication No. 2008-028614, Japanese Patent Laid-Open Publication No. 2008-052669, Japanese Patent Laid-Open Publication No. 2008-146197). The contents of these patent publications are incorporated herein by reference in their entirety.

SUMMARY OF THE INVENTION

According to one aspect of the present invention, a robot system is configured to move by using a running subsystem, and is provided with a camera and a distance direction sensor. A controller for controlling the robot is configured to switch, on the basis of predetermined switching conditions, between an image guidance mode in which the controller controls the running subsystem on the basis of a comparison result between the real-time image and the instruction image, and a measurement distance guidance mode in which the controller controls the running subsystem on the basis of a detection result of the distance direction sensor.

According to another aspect of the present invention, a planar sign is provided along a running path of the robot. The planar sign has a diffusive reflection face for diffusive reflection of light and a mirror surface finished portion for mirror reflection of the light. The controller is configured to store map data of the running path including a position of the planar sign. The controller is configured to compare a detection result of the distance direction sensor and the map data stored in a map data memory so as to determine a progress direction of the robot.

According to further aspect of the present invention, the controller is configured to obtain an offset value against the running path instructed in advance. The controller is configured to control the running subsystem on the basis of the comparison result between the real-time image and the instruction image, and on the basis of the offset value obtained by an offset value obtaining unit.

BRIEF DESCRIPTION OF THE DRAWINGS

The present invention will be described in further detail with reference to the accompanying drawings wherein:

FIG. 1A shows a configuration of a robot of first to third embodiments of the present invention;

DETAILED DESCRIPTION OF THE PREFERRED EMBODIMENTS

First Embodiment

Figure 1B:
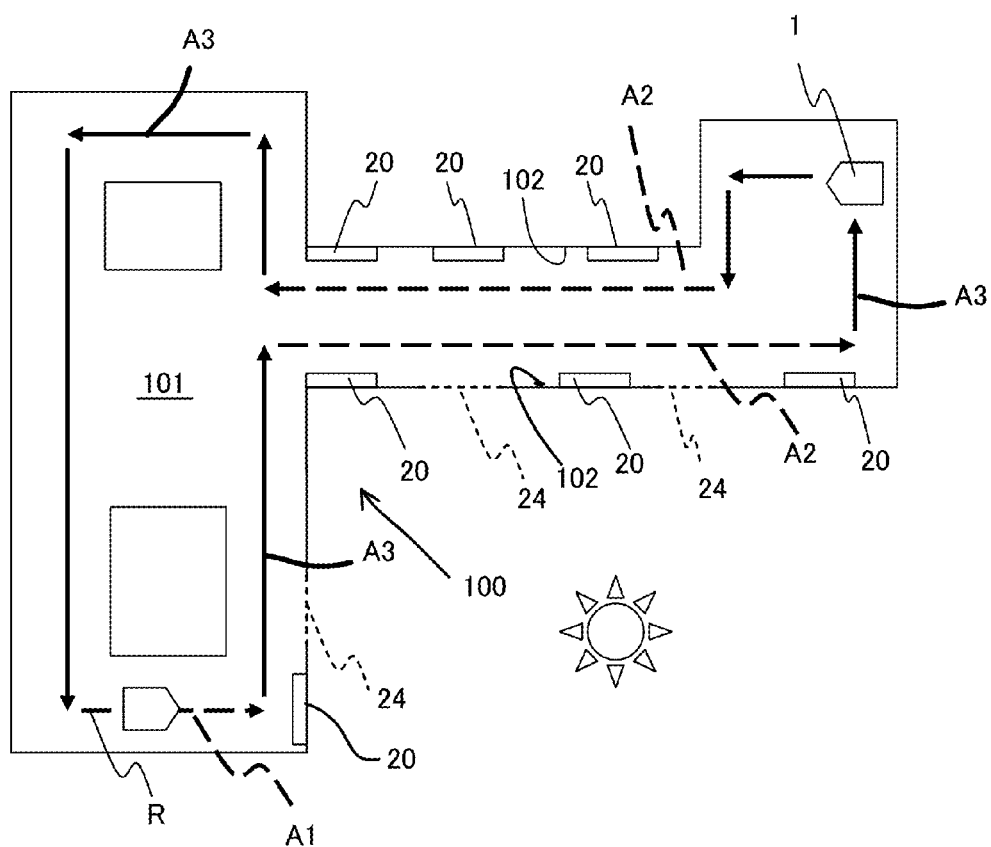
FIG. 1B is a diagram schematically showing a whole configuration of the first to second embodiments.

FIG. 1A shows a robot 1 having a chassis 2, a drive controller (controller device) 3 constituted by an electronic arithmetic unit, a memory unit and an input device, a drive unit (running subsystem) 4 and a plurality of wheels (running subsystem) 5.

The drive unit 4 is configured to control driving of the wheels 5, and is directed to drive the wheels 5 by using the drive controller 3 so as to control forward and backward movements and a position angle (steering direction) of the robot 1.

The robot 1 is provided with a camera 6 directed in the progress direction on a central axis of the robot 1. The camera 6 is configured to capture an image in the progress direction and to obtain image data (real-time image) in real time. The camera 6 can obtain a still image as well.

The camera 6 provides the drive controller 3 with a captured image. The camera 6 is directed in the progress direction in order to prevent an image captured by the camera 6 from being disturbed even while the robot 1 is running at high speed, and to obtain a more stable real-time image.

Figure 8:
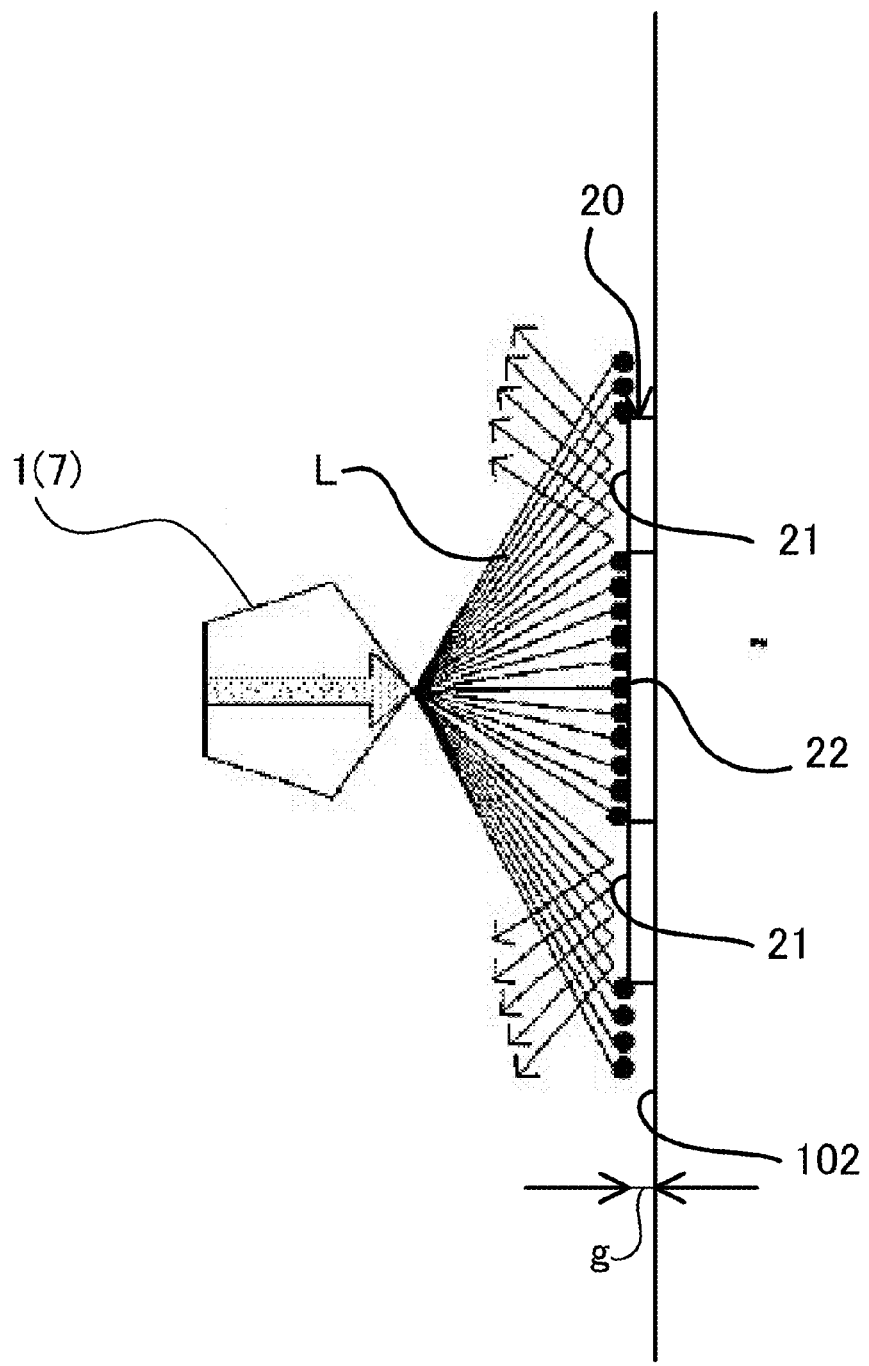
FIG. 8 is a plan view schematically showing a configuration of a planar sign and the robot of the second embodiment.

The robot 1 has a laser distance sensor (distance direction sensor) 7 having a laser transmitter such as a semiconductor laser. As shown in FIG. 8, the laser distance sensor 7 is configured to emit laser light for detection (light for detection) at every particular angle (e.g., at every 0.5 degrees) in a particular angular search range. The laser distance sensor 7 is configured to measure the time until the light returns after being reflected by an object so as to detect a distance to each of target points on the object and an angle of measurement. That is, an effective search range (in which detection of a distance and an angle is effective) of the laser distance sensor 7 is a fan-shaped plane of a central angle equal to the search angle, and parallel to an arrangement plane of the chassis 2 (horizontal).

The laser distance sensor 7 is configured to measure a distance to a structure such as a wall or a pillar in the vicinity of the robot 1, and a distance to an object in the vicinity of the robot 1 such as a pedestrian. The laser distance sensor 7 is configured to provide the drive controller 3 with measured distance data.

As shown in FIG. 1B, the robot 1 runs in a building on a running path indicated by each of arrows. The robot 1 uses the laser distance sensor 7 in a range on the running path (distance sensor use range) where external light enters into the building through windows and an image captured by the camera 6 changes depending on a change of the external light.

Figure 3:
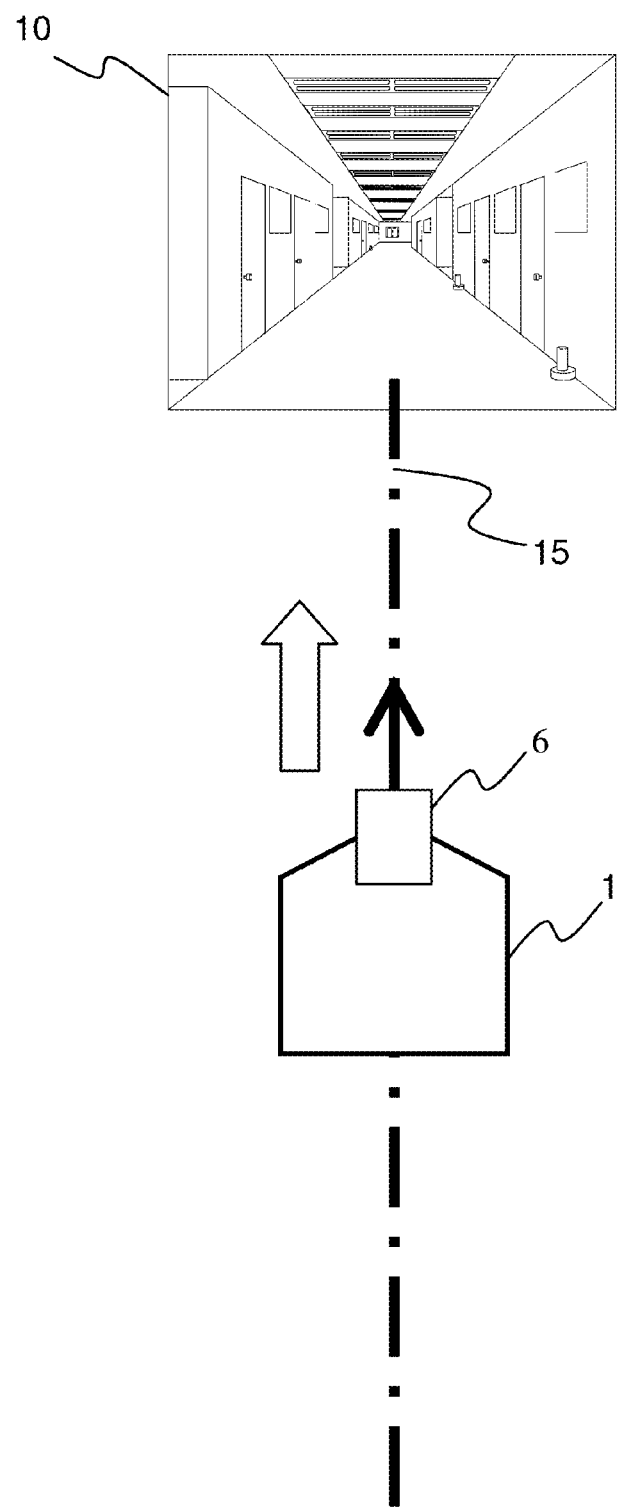
FIG. 3 is a diagram showing a state in which a progress direction of the robot agrees with a running path.

The robot 1 of the embodiment is so configured, in the distance sensor use range, that the robot 1 captures an image of a landmark 10 for image capturing on an extension of a straight running path 15 shown in FIG. 3 by using the camera 6, that the robot 1 measures a distance to an object in the vicinity of the robot 1 by using the laser distance sensor 7, and that the drive controller 3 properly combines a captured image and distance data so as to calculate a movement correction value of the robot 1 with respect to the running path and to perform running control of the robot 1.

Figure 2A:
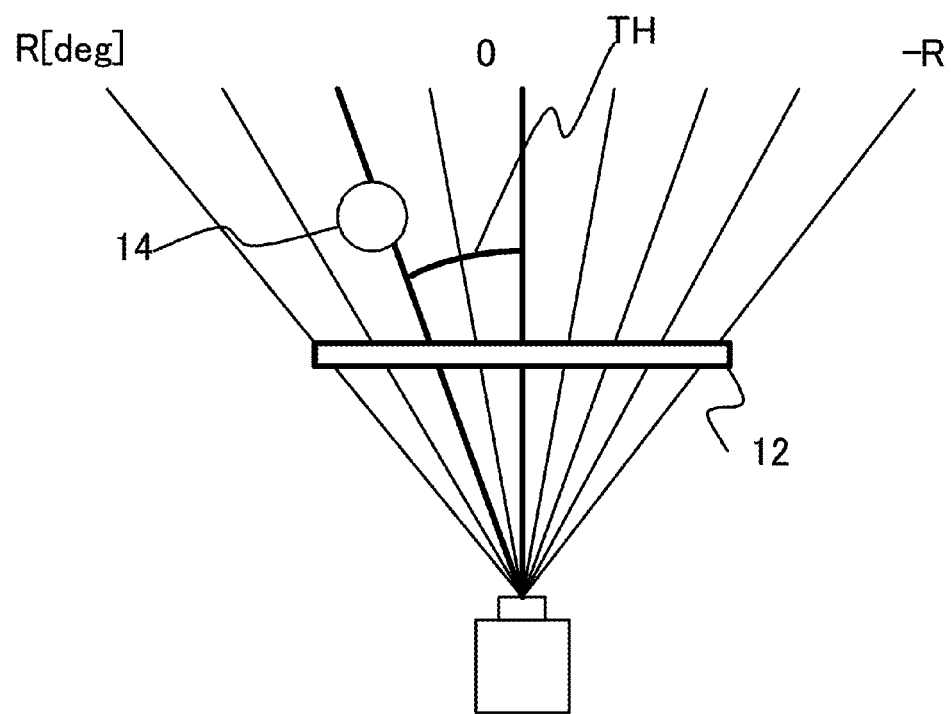
FIG. 2A is a diagram showing a characteristic of an imaging device of the robot.
Figure 2B:
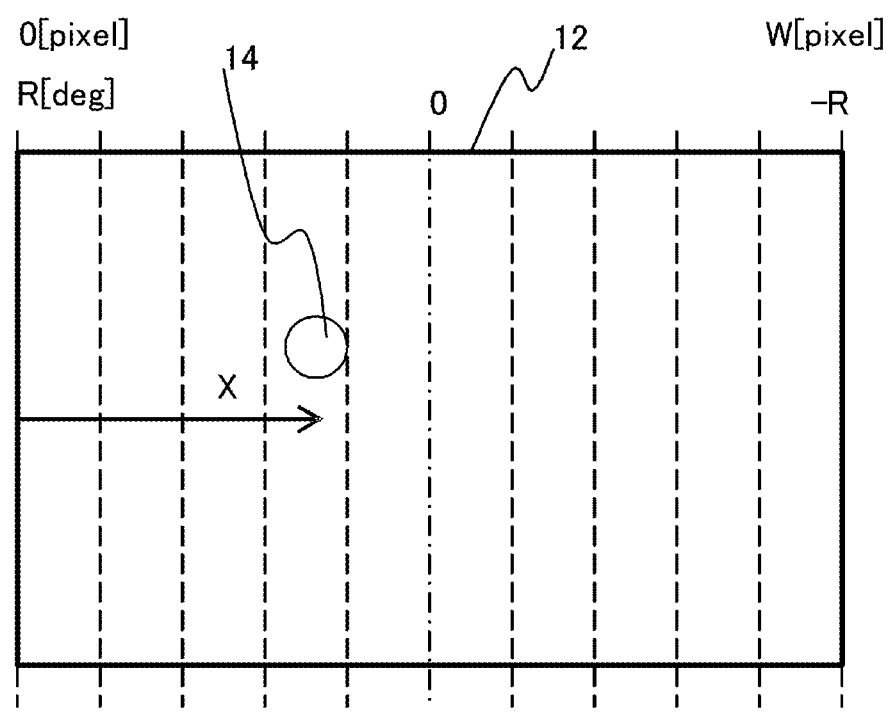
FIG. 2B is a diagram showing a characteristic of the imaging device of the robot.

As shown in FIG. 2A, there is a one-to-one relationship between a position of a captured object 14 in a captured image 12 and an angle TH of the captured object 14 as viewed from the camera 6. As shown in FIG. 2B, let the capture range (angular range) of the camera 6 and the width of the image represented by the number of pixels be −R[DEG] to R[DEG] and W[PIXEL], respectively, and let the position of the captured object in the image be X[PIXEL]. Then, the angle TH of the captured object 14 as viewed from the camera 6 is represented by the following Equation (1).

$$TH = -2*R/W*X + R \qquad (1)$$

As the camera 6 of the embodiment is directed in the progress direction of the robot 1, the angle TH of Equation (1) represents the angle of the landmark 10 for image capturing with respect to the progress direction of the robot 1.

Figure 4:
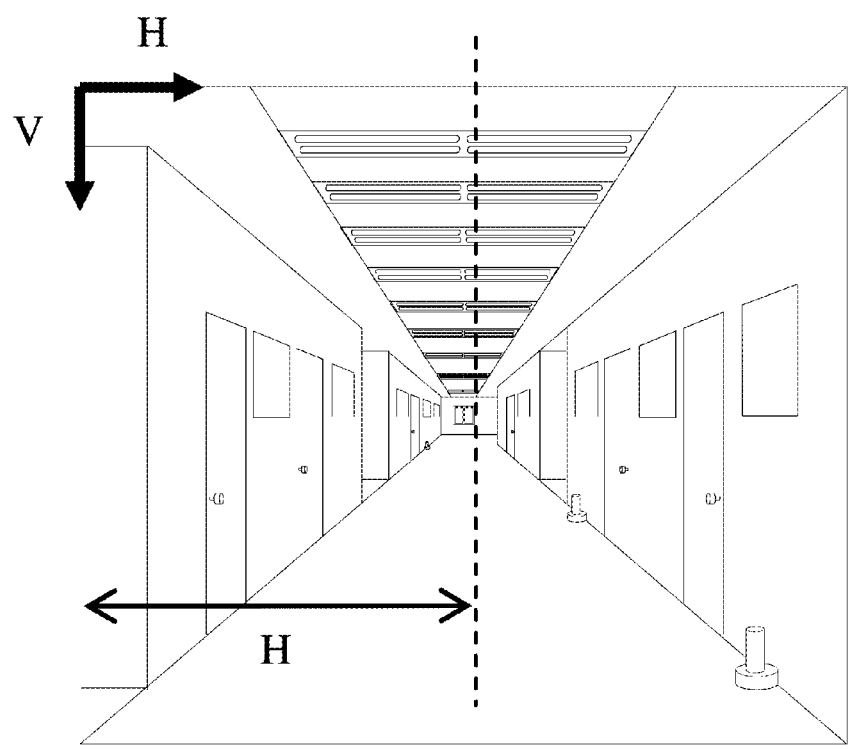
FIG. 4 is a diagram showing a captured image in the state shown in FIG. 3.

The drive controller 3 is configured to calculate and correct a left-to-right position error with respect to the straight running path 15 and a position angle of the robot 1 by using the characteristics of the camera 6 described above as described below. It is assumed, in the present invention, that the robot 1 stands still on the straight running path 15, obtains an image by using the camera 6 and stores the obtained image as a landmark for image capturing in advance. FIG. 4 shows an image captured under the conditions shown in FIG. 3. The drive controller 3 of the first embodiment stores the whole captured image and uses it as the landmark for image capturing. The drive controller 3 obtains the position in the image "H" of the landmark for image capturing by pattern matching with an image captured while the robot 1 is running.

Figure 5:
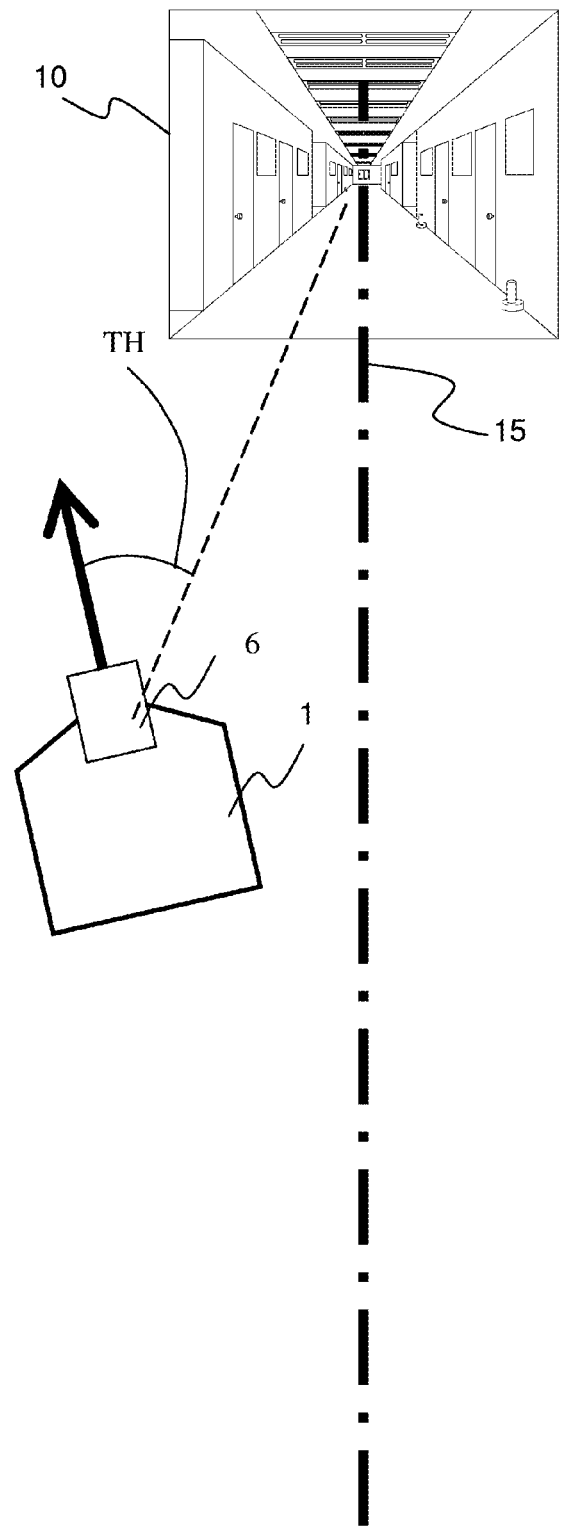
FIG. 5 is a diagram showing a state in which the progress direction of the robot does not agree with the running path.

FIG. 5 shows a state in which the robot 1 has left the straight running path 15, where "TH" represents an angle of the landmark for image capturing with respect to the camera 6.

Figure 6:
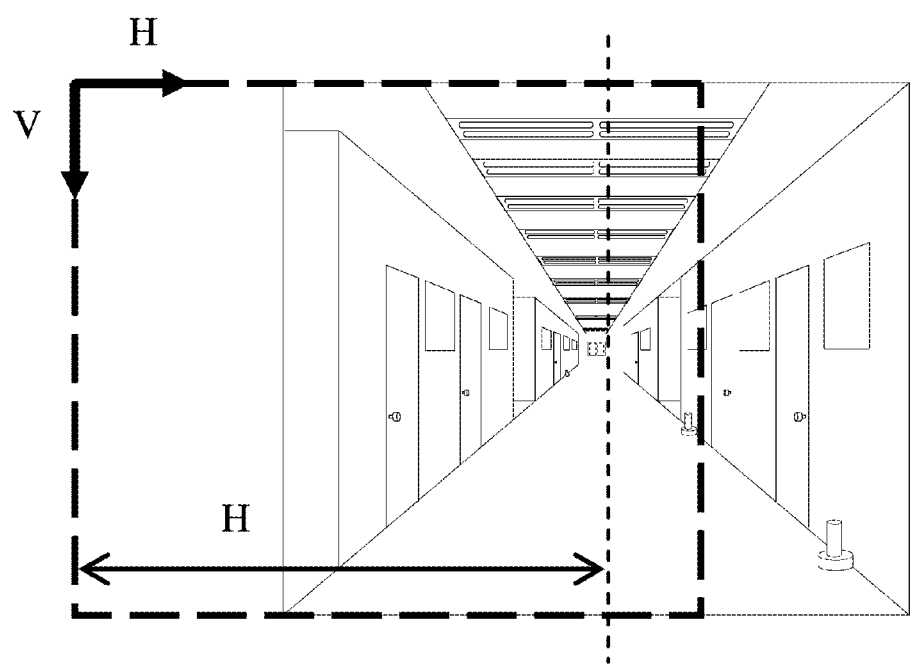
FIG. 6 is a diagram showing a captured image in the state shown in FIG. 5.

FIG. 6 shows an image captured by the camera 6 in the state shown in FIG. 5, where "H" represents the position of the landmark for image capturing in the horizontal direction on the image. If the position of the captured object (pixel arrangement) on the image shown in FIG. 6 is V[PIXEL], the angle TH can be calculated by substituting H for X of Equation (1). The drive controller 3 feeds the angle TH calculated above back to the drive unit 4.

A control equation for controlling and correcting a moving speed of the robot 1 will be shown as an example of a control equation of the first embodiment. A target value of the position angle of the robot 1 with respect to the landmark for image capturing for exactly directing the robot 1 in the direction of the straight running path 15 is represented by TH=0. Let a position angle change rate of the robot 1 and a control gain for the position angle be VTH and GTH, respectively. Then, a directed value of the position angle change rate for correcting the position angle so that the robot 1 runs on the straight running path 15 is represented by following Equation (2).

$$VTH = -GTH*THF \qquad (2)$$

The drive controller 3 controls the wheels 5 of the robot 1 in accordance with VTH obtained from Equation (2). The drive controller 3 thereby calculates the directed value of the position angle change rate for correcting the position angle with respect to the straight running path 15, drives the wheels 5 and performs running control of the robot 1.

According to the process described above, the robot 1 can correct its position and position angle so as to move exactly on the straight running path 15.

Figure 7:
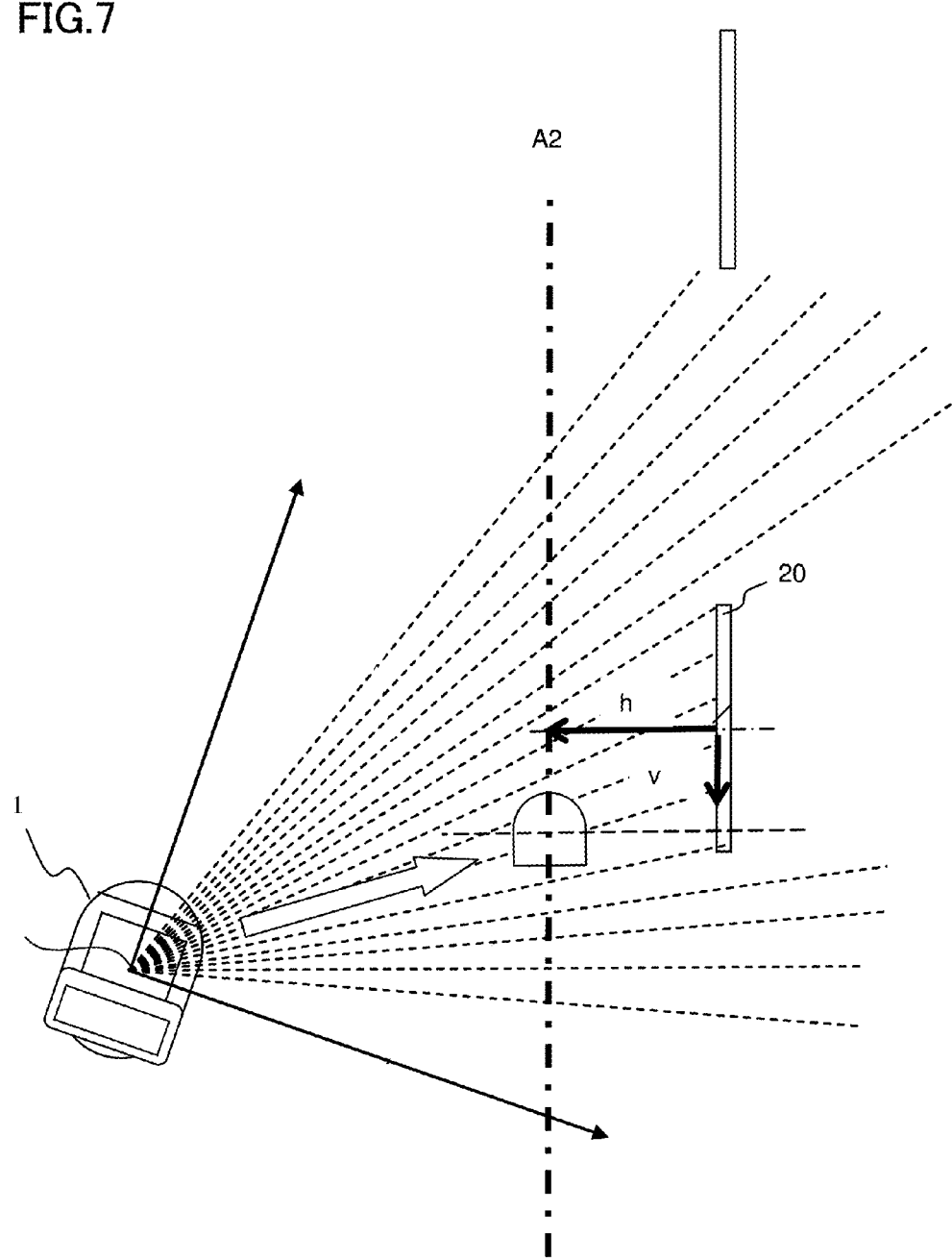
FIG. 7 is a diagram illustrating measurement conditions by means of a distance direction sensor.

FIG. 7 shows a method for measuring a distance by means of a distance measurement unit of the first embodiment. If a distance sensor that adopts a method for scanning a plane by means of a semiconductor laser is used as the distance measurement unit, the distance measurement unit emits laser light at every constant angle, as shown in FIG. 7, and measures the time until the light returns after being reflected by an object so as to detect a distance to each of target points on the object. If a plane-shaped landmark for distance measurement is placed, as shown in FIG. 3, the distance measurement unit searches consecutive measurement data for an area in which the distance continuously changes. The distance measurement unit evaluates linearity of a searched for candidate area of the landmark for distance measurement by using the least mean square method. The distance measurement unit calculates a position of a reference point of the landmark for distance measurement and an angle of the landmark for distance measurement as viewed from the robot 1 from measurement data of both ends of an area judged to be planar. The distance measurement unit calculates a correction value from the current position of the robot 1 by using the position and the angle of the landmark for distance measurement and positions of designated passing points h and v designated in advance. It is preferable that the robot 1 stand still so that the distance measurement unit precisely measures the landmark for distance measurement.

The drive controller 3 drives the robot 1 and positions the robot 1 at the designated passing point on the basis of the correction value. The drive controller 3 can thereby correct the path of the robot 1.

The method for correcting the path by means of the camera and the method for correcting the path by means of the distance measurement unit can be combined so that the robot 1 can steadily correct its path and can run exactly on the path even under conditions where external light changes, as described below.

On each of straight running paths, if a change of a captured image caused by the change of external light is slight, there is a high probability that pattern matching between the captured image and the landmark for image capturing will succeed, and the robot 1 can thereby run on the running path only by using the camera. Meanwhile, if the image captured by the camera 6 changes depending upon the change of external light such as in the distance sensor use range, the number of distinctive points for which the pattern matching between the captured image and the landmark for image capturing succeeds will decrease. Under such conditions, if the number of the distinctive points for which the pattern matching of the landmark for image capturing succeeds is equal to or more than a threshold value given in advance, the drive controller 3 judges that the matching result is effective and the robot 1 runs without standing still. If the number of the distinctive points is less than the threshold value, the robot 1 stands still, the distance measurement unit measures the landmark for distance measurement, and the drive controller 3 judges the measurement result to be effective and corrects the running path. The drive controller 3 can thereby properly combine the captured image and the distance data so as to calculate a movement correction value of the robot 1 with respect to the running path, and can perform running control of the robot 1 so that the robot 1 runs on the instructed running path and reaches a goal.

Moreover, if the drive controller 3 perceives a plurality of landmarks for image capturing and cannot judge which one of the landmarks provides a measurement result to be used, the drive controller 3 may automatically change the landmarks. Moreover, if an angular error from the progress direction calculated from an image captured by the camera 6 exceeds a range determined in advance, the drive controller 3 may judge that the pattern matching causes an error or that the angular error with respect to the running path is excessively large, and may automatically change to the method for correcting the running path by means of the distance measurement unit.

The running path is formed by straight portions and direction change portions each connecting the adjacent straight portions. The robot 1 is configured to judge on which of the straight portion and the direction change portion the robot 1 is currently running either by using a method for comparing distance data included in running data given in advance and a distance covered from starting up to that time or by using a method for completing positioning the end of the straight running path by means of the distance sensor. The robot 1 is configured to perform the running control of the present invention on the straight portion, and to change the progress direction on the basis of the number of rotations of the wheels 5 on the direction change portion so as to start running on the next straight portion.

Second Embodiment

For a robot system 100 of a second embodiment of the present invention, as shown in FIG. 1B, a running path R is set on the floor 101 in advance. The robot system 100 is so configured that the robot 1 runs autonomously along the running path R. A plurality of plane-shaped landmarks (planar signs, targets) 20 having a light receiving face each is provided in the vicinity of the running path R. The path of the running path R can be properly changed.

Ranges A1-A3 are set on the running path R for each of methods for controlling the robot 1. In the range A1, the robot 1 progresses to a planar sign existing in front in the progress direction. In the range A2, the robot 1 progresses along a wall 102 extending along the running path R. In the range A3, the robot 1 is mainly controlled by an image guidance unit described later.

Although the running path R and the ranges A1-A3 are shown in FIG. 1B for easier explanation, no lines, etc. are drawn on the floor 101 and so on for indicating the running path R and the ranges A1-A3, and an interface between each of the ranges A1-A3 is not strictly specified.

Figure 9:
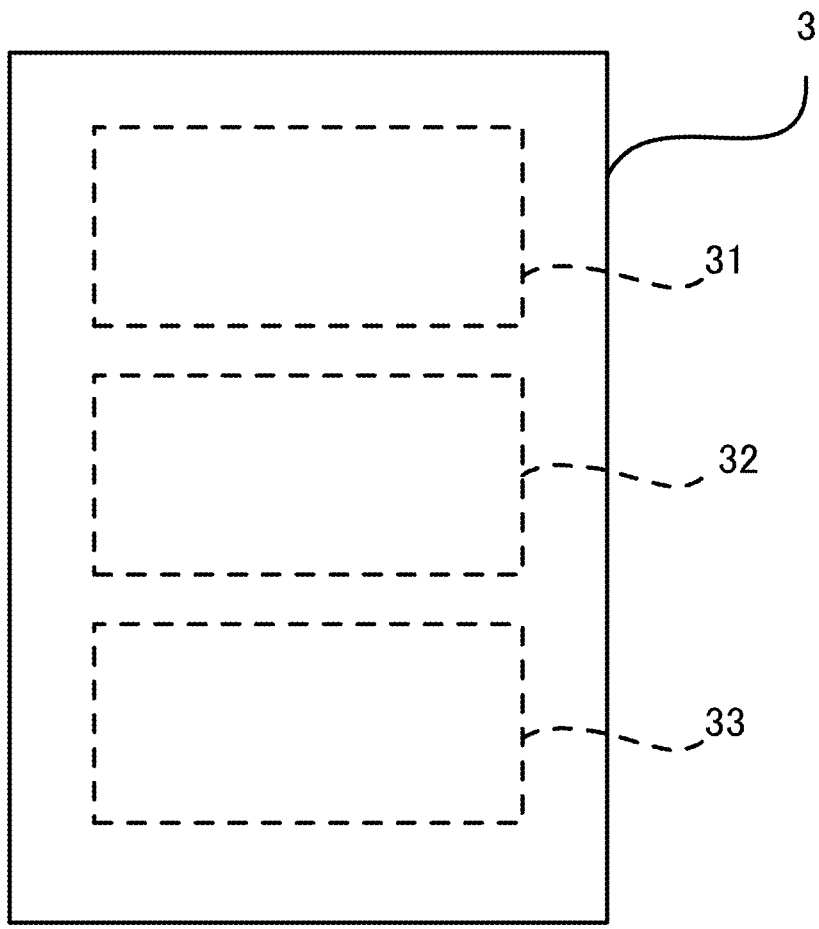
FIG. 9 is a block diagram showing a functional configuration of a controller of the second embodiment.
Figure 10:
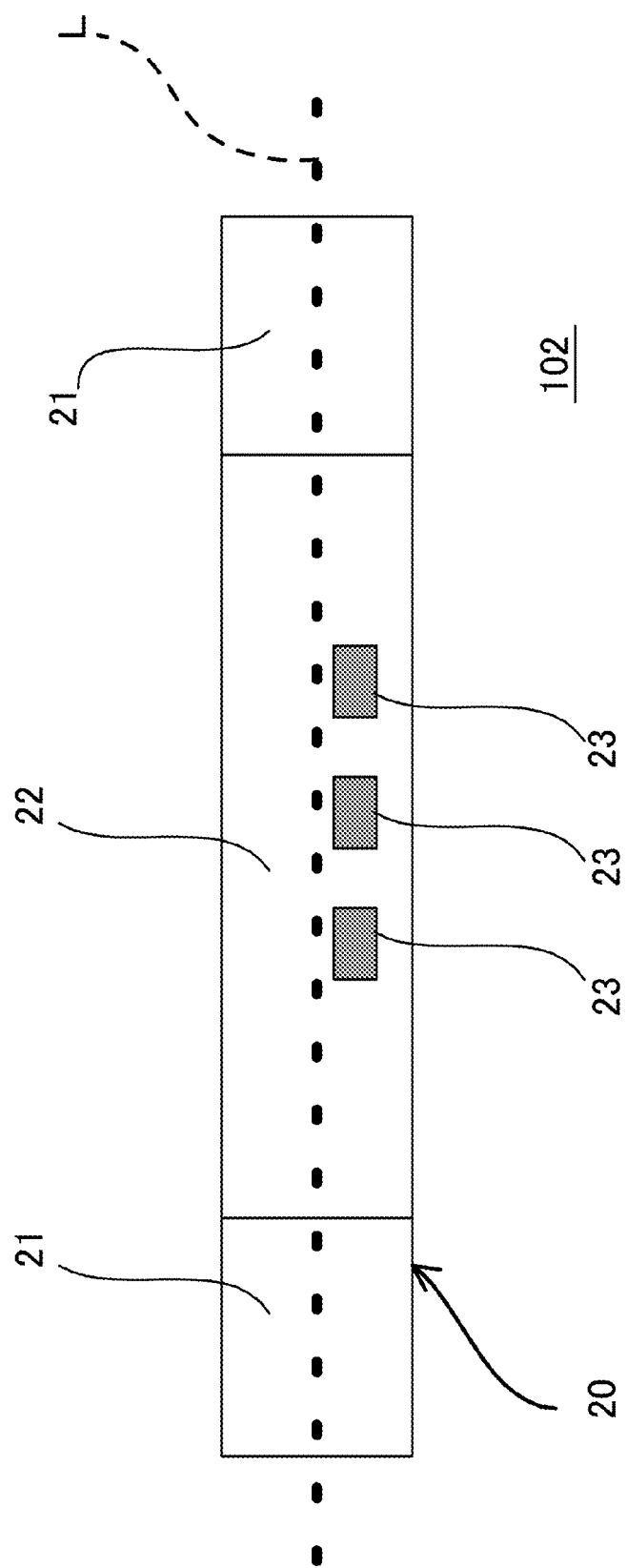
FIG. 10 is a front view schematically showing the planar sign of the second embodiment.

The drive controller 3 has functional blocks, as shown in FIG. 9, which are a progress direction determining unit (progress direction determining means) 31, an image guidance unit (image guidance means) and a memory unit (map data memory means, instruction image memory means) 33.

The progress direction determining unit 31 is configured to compare map data stored in advance in the memory unit 33 and an advance detection result of the laser distance sensor 7 so as to detect the position of the robot 1. The progress direction determining unit 31 is configured to provide the drive unit 4 with a signal concerning the progress direction so that the robot 1 runs along the running path R.

The map data includes a floor 101 coordinate system of the running path R and coordinates of positions of the landmarks 20.

The running path R is formed by straight ranges (straight portions) indicated by arrows in FIG. 1B and direction change portions each connecting the adjacent straight portions. The map data includes process data for judging on which of the straight portion and the direction change portion the robot 1 currently runs either by using a method for comparing distance data included in running data given in advance and a distance covered from starting up to that time or by using a method for completing positioning the end of the straight running path by means of the distance sensor, for performing the running control of the present invention on the straight portion, and for changing the progress direction on the basis of the number of rotations of the wheels 5 on the direction change portion so as to start running on the next straight portion.

The memory unit 33 stores in advance a plurality of instruction images each captured as a target image for a real-time image on the camera 6 at each of a plurality of instruction points which are discrete points on the running path R.

The image guidance unit 32 is configured to control the drive unit 4 on the basis of a comparison result between the real-time image and the instruction image.

(Range A1)

The robot 1 is controlled in the range A1 as described below. In the range A1, as shown in FIG. 1B, external light enters through a window 24 existing in front of the running path R. As the robot 1 comes closer to the window 24, a rate of a change of light conditions by time in the vicinity of the running path R increases due to the external light.

In the range A1, the image guidance unit 32 controls the drive unit 4 before the laser distance sensor 7 detects the landmark 20. After the laser distance sensor 7 detects the landmark 20, the progress direction determining unit 31 controls the drive unit 4 from the position of the detected landmark 20 to a preset offset point (target point).

Figure 11:
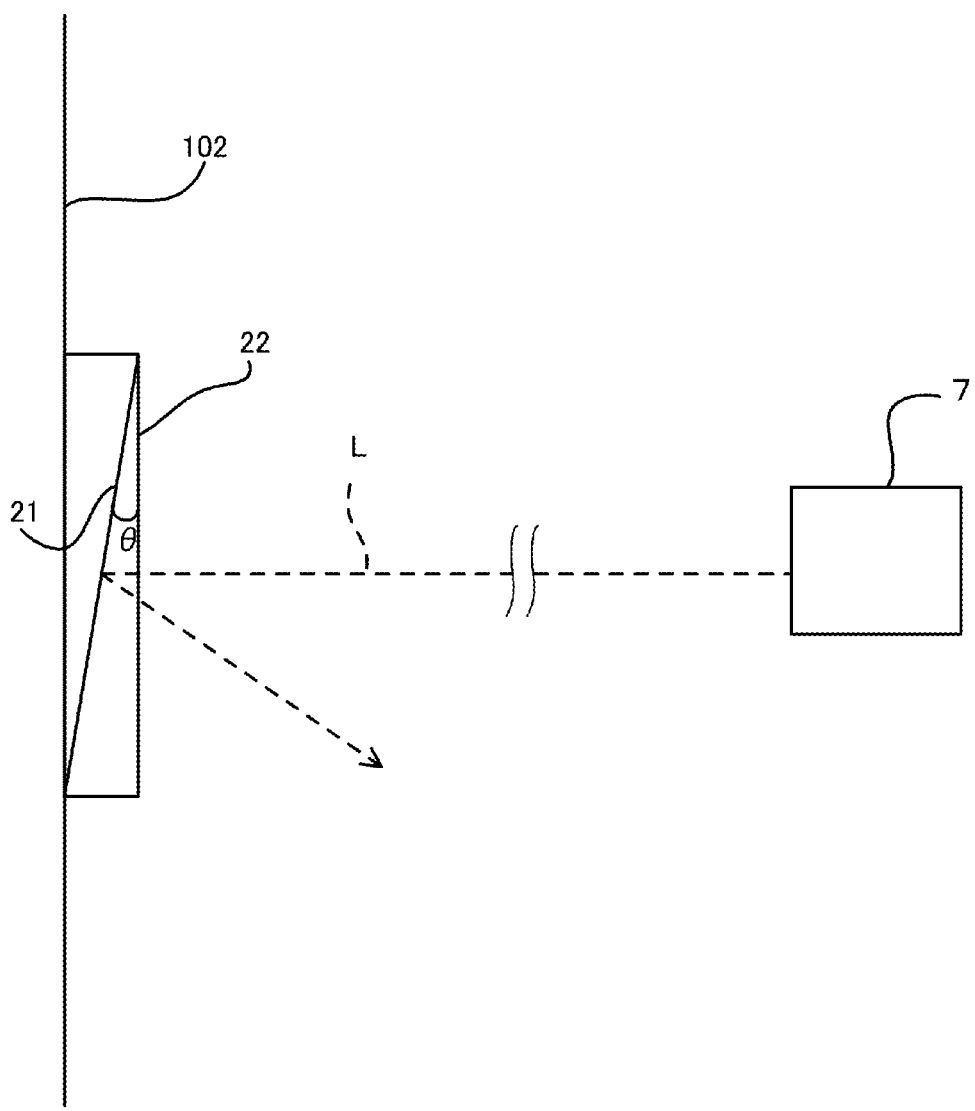
FIG. 11 is a side view schematically showing the planar sign of the second embodiment as viewed along a wall.

The landmark 20 is stuck to the wall 102 as shown in FIGS. 8 and 11. The landmark 20 is formed by mirror surface finished portions 21 for mirror reflection (total reflection) of light and a diffusive reflection face 22 for diffusive reflection of light. The mirror surface finished portions 21 are arranged on both ends of the diffusive reflection face 22, and inclines downwards by a particular angle $\theta$ with respect to a plane perpendicular to the horizontal direction.

The mirror surface finished portion 21 may be formed by any material that is mirror reflective in its nature. The diffusive reflection face 22 may be formed by proper material such as paper, resin and so on, which should reflect light in every direction regardless of an angle of incidence of the light for detection emitted from the laser distance sensor 7.

The diffusive reflection face 22 is provided with patterns 23 which becomes a distinctive point of an image each in a case where the image guidance unit 32 controls the drive unit 4. In FIG. 11, "L" represents a direction of emission of the light for detection emitted from the laser distance sensor 7.

As the wall 102 and the diffusive reflection face 22 diffusively reflect the light for detection emitted from the laser distance sensor 7, as shown in FIG. 8, the laser distance sensor 7 can sense the light for detection reflected by the wall 102 and the diffusive reflection face 22 so as to detect their distances and directions even in a case where the laser distance sensor 7 is positioned diagonally with respect to the wall 102 and the diffusive reflection face 22.

Meanwhile, as shown in FIG. 11, the light for detection emitted from the laser distance sensor 7 to the mirror surface finished portion 21 is reflected downwards by an inclination of the mirror surface finished portion 21. Moreover, the mirror surface finished portion 21 totally reflects the light in the horizontal direction except in a case where, as shown in FIG. 8, the robot 1 exactly faces the mirror surface finished portion 21. That is, the light reflected by the mirror surface finished portion 21 is not reflected toward the laser distance sensor 7, and the laser distance sensor 7 judges that an area corresponding to the mirror surface finished portion 21 does not exist in the search range.

The progress direction determining unit 31 obtains the position (direction) and the distance of the landmark 20 provided on the wall 102 on the basis of a detection result of the laser distance sensor 7. The progress direction determining unit 31 compares the position and the distance of the landmark 20 with the map data (the shape of the landmark) stored in the memory unit 33, and gives the drive unit 4 directions so that the robot 1 is on and along the running path R in the map data.

(Range A2)

The robot 1 is controlled in the range A2 as described below. As external light entering through the window 24 on a side of the running path R is too much in the range A2, the robot 1 is so configured that the progress direction determining unit 31 mainly controls the drive unit 4.

If a plane-shaped landmark 20 for distance measurement is provided, as shown in 7, the progress direction determining unit 31 searches a range where distances measured at continuous measurement angles continuously change. The progress direction determining unit 31 evaluates linearity of a searched out candidate area of the landmark for distance measurement by using the least mean square method. The progress direction determining unit 31 calculates a position of a reference point of the landmark for distance measurement and an angle of the landmark for distance measurement as viewed from the robot 1 from measurement data of both ends of an area judged to be planar. The progress direction determining unit 31 calculates a correction value from the current position of the robot 1 by using the position and the angle of the landmark for distance measurement and positions of designated passing points h and v designated in advance. It is preferable that the robot 1 stand still so that the distance measurement unit precisely measures the landmark for distance measurement.

The drive controller 3 drives the robot 1 and positions the robot 1 at the designated passing point on the basis of the correction value. The drive controller 3 can thereby correct the path of the robot 1.

The landmark 20 in the range A2 is formed to be the same as the corresponding one in the range A1.

As the second embodiment is configured as described above, the light for detection is reflected by the mirror surface finished portion 21 and by the diffusive reflection face 22 (or the wall 102) in significantly different conditions, even in a case where the landmark 20 is arranged in contact with the wall 102. As sensing results of the light reflected by them produced by the laser distance sensor 7 are significantly different, the distance measurement unit can precisely detect the position of the light receiving face of the landmark 20. Thus, an occupation rate of the running path R and space required for autonomous running of the robot 1 can be reduced and space efficiency can be increased. Even if the landmark 20 is shaped to be thin and planar and a gap g between the light receiving face and the wall on the back is made small, the distance measurement unit can precisely detect the position of the landmark 20.

On the running path R, if a change of a captured image caused by the change of external light is slight (in the range A3), there is a high probability that pattern matching between the captured image and the landmark for image capturing succeeds, and the robot 1 can run on the running path only by using the camera. Meanwhile, in the ranges A1 and A2, if a change of a real-time image obtained by the camera 6 is significant due to a change of light conditions including external light even in a case where the image is captured from the same position and in the same direction, the number of distinctive points on which the pattern matching between the captured image and the landmark for image capturing succeeds decreases.

In such conditions, if the number of the distinctive points on which the pattern matching of the landmark for image capturing succeeds is a threshold value given in advance and over, the drive controller 3 judges that the matching result is effective and the robot 1 runs without standing still. If the number of the distinctive points is smaller than the threshold value, the robot 1 once stands still, the distance measurement unit measures the landmark for distance measurement, and the drive controller 3 judges the measurement result to be effective and corrects the running path. The drive controller 3 can thereby properly combine the captured image and the distance data so as to calculate a movement correction value of the robot 1 with respect to the running path, and can perform running control of the robot 1 so that the robot 1 runs on the instructed running path and reaches a goal.

Moreover, if the drive controller 3 perceives a plurality of landmarks for image capturing and cannot judge which one of the landmarks provides a measurement result to be used, the drive controller 3 may automatically change the landmarks. Moreover, if an angular error from the progress direction calculated from an image captured by the camera 6 exceeds a range determined in advance, the drive controller 3 may judge that the pattern matching causes an error or that the angular error with respect to the running path is excessively large, and may automatically change to the method for correcting the running path by means of the laser distance sensor 7.

Although the mirror surface finished portion 21 of the landmark 20 is provided with the inclination θ, the inclination θ may be omitted, and the mirror surface finished portion 21 and the diffusive reflection face 22 may be formed on the same plane. The landmark 20 can thereby be formed thinner.

Moreover, if the robot 1 is even slightly inclined towards the landmark 20, the laser distance sensor 7 hardly receives the light reflected by the mirror surface finished portion 21, and the drive controller 3 can precisely distinguish the mirror surface finished portion 21 and other diffusive reflection faces.

Third Embodiment

Figure 13:
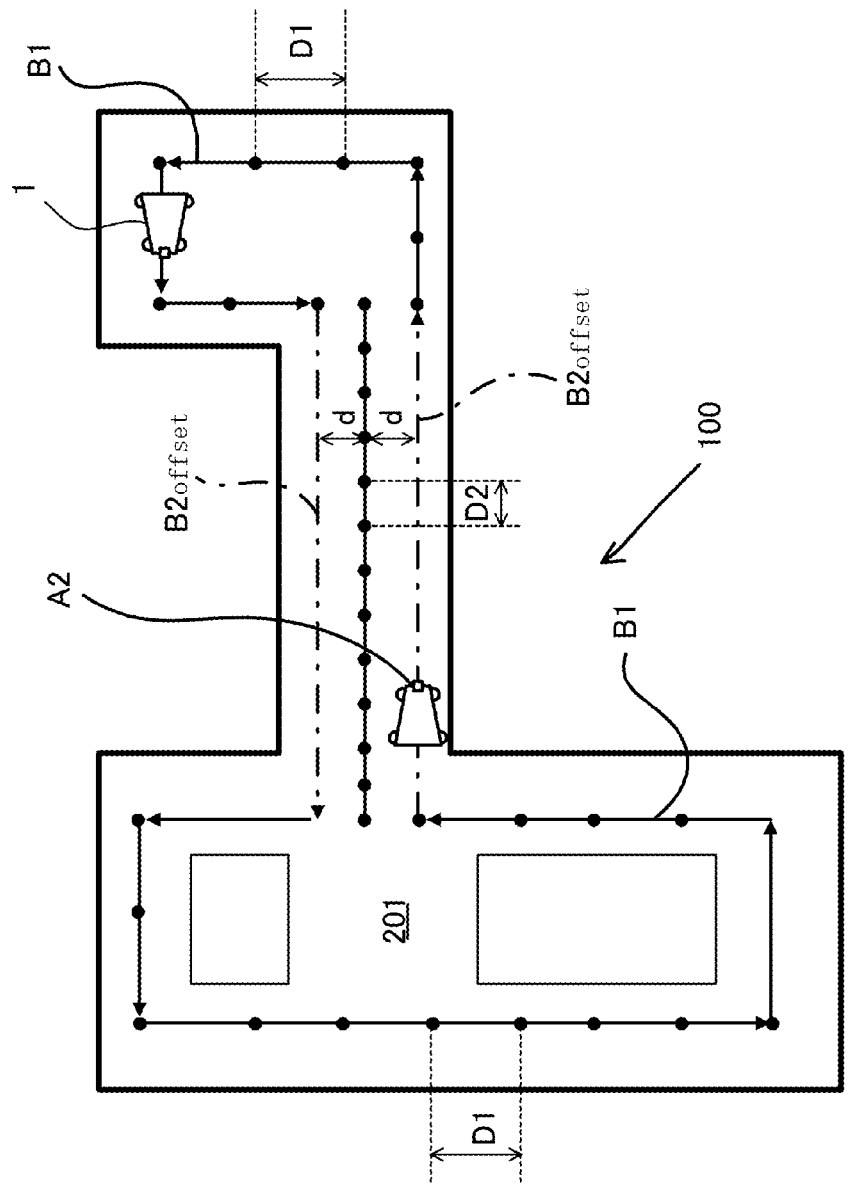
FIG. 13 is a diagram schematically showing a whole configuration of the third embodiment.

For a robot system of a third embodiment of the present invention, as shown in FIG. 13, a running path R is set on the floor 101 in advance. The robot system of the third embodiment is so configured that a plurality of robots 1 run autonomously along the running path R. A plurality of instruction points are indicated on the running path R by black round marks. The path of the running path R can be properly changed.

The running path R includes a normal running range B1 in which the robot runs autonomously along a path instructed by instruction running described later (a range having a zero offset value), and an offset running range B2 in which the robot runs autonomously on a parallel running path B2 offset that is offset against the path instructed by the instruction running by a particular offset value d (a range having a non-zero offset value).

In the offset running range, the robots 1 run while facing each other (passing each other).

Although the running path R and the ranges B1-B3 are shown in FIG. 13 by arrows or lines for easier explanation, no lines, etc. are drawn on the floor 101 and so on for indicating the running path R and the ranges B1 and B2.

The drive controller 3 of the third embodiment is configured to obtain an offset value d in the offset running range B2 from an input through the input device, and to store the offset value d in the memory unit.

The drive unit (the running subsystem) 4 is configured to control the drive of the wheels (the running subsystem) 5, and is directed to drive the wheels 5 by the drive controller 3 so as to control forward and backward movements and a position angle (steering direction) of the robot 1.

The drive controller 3 performs a control operation as a running controller as described below.

Figure 12:
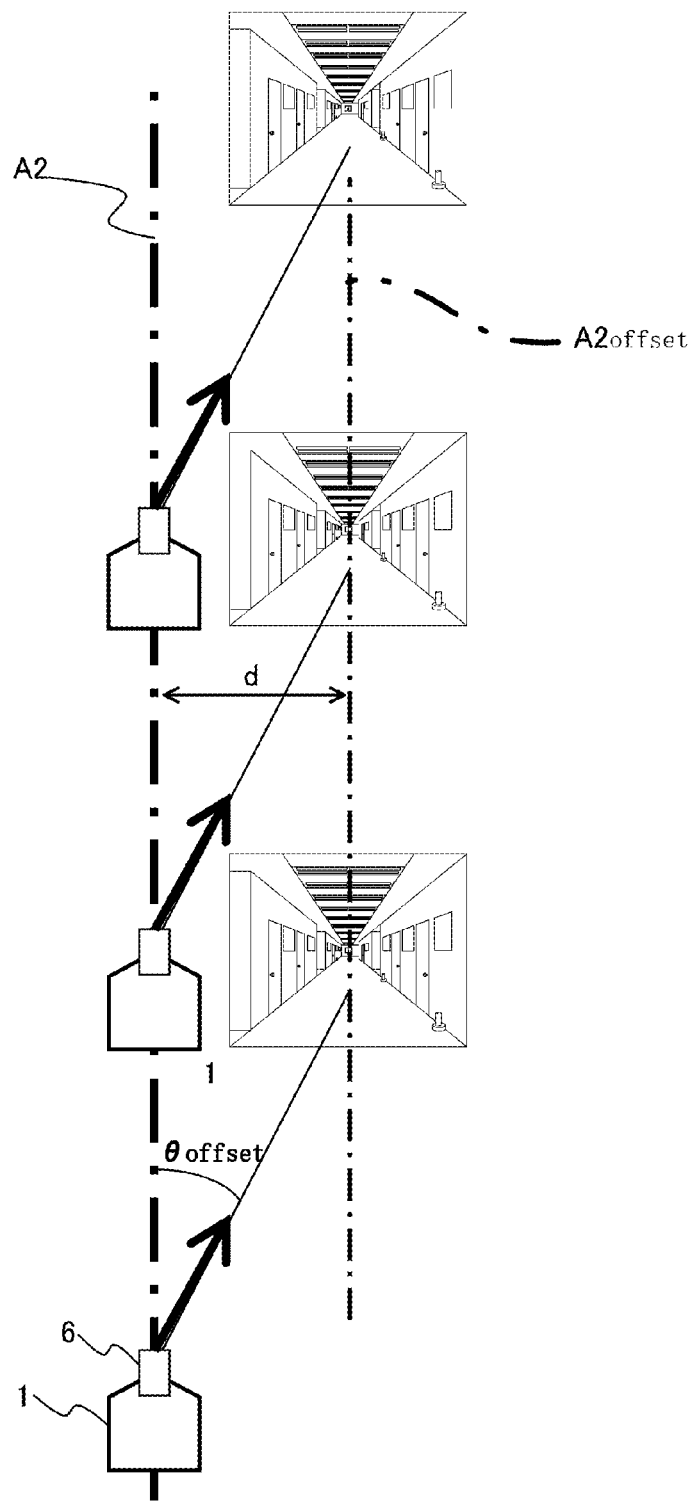
FIG. 12 is a diagram illustrating control conditions in an offset running range of the third embodiment.

As shown in FIGS. 12, 2A and 2B, the drive controller 3 is configured to calculate the value of Equation (1) at every particular interval of an arithmetic operation by using a real-time image obtained by the camera 6 and an instruction image of a highest degree of matching in a plurality of instruction images stored in the memory unit.

Moreover, the drive controller 3 is configured to calculate a target value θoffset of the angle TH described above on the basis of the obtained offset value d.

If the offset value d equals zero (i.e., in the normal running range B1), the target value θoffset equals zero.

As the camera 6 is provided in the same direction as the progress direction of the robot 1, the value TH of Equation (1) represents an angle of an instruction image (the landmark for image capturing) 10 with respect to the progress direction of the robot 1.

The drive controller 3 is configured to calculate and correct a left-to-right position error with respect to the straight running path 15 and a position angle of the robot 1 by using the characteristics of the camera 6 described above as described below.

FIG. 4 shows a captured image in conditions shown in FIG. 3. The drive controller 3 of the third embodiment stores the whole captured image and uses it as the landmark for image capturing. The drive controller 3 obtains the position "H" of the landmark for image capturing by pattern matching with an image captured while the robot 1 is running.

FIG. 5 shows a state in which the robot 1 has left the straight running path 15, where "TH" represents an angle of the landmark for image capturing with respect to the camera 6.

FIG. 8 shows an image captured by each of the cameras in the state shown in FIG. 5. FIG. 8 shows an image captured by the camera, where "H" represents the position of the landmark for image capturing in the horizontal direction on the image. If the position of the captured object (in pixels) on the image shown in FIG. 8 is V[PIXEL], the value of TH can be calculated by substituting H for X of Equation (1).

The drive controller 3 is configured to feed a directed value back to the drive unit 4 so that the calculated value of TH equals the target value θoffset as shown in FIG. 12.

A control equation for controlling and correcting the speed of the robot 1 in the normal running range B1 is shown below as an example of control equations. A target value of the position angle of the robot 1 with respect to the landmark for image capturing for exactly directing the robot 1 in the direction of the straight running path is represented by TH=0. The target value while the robot 1 is running in the offset running range B2 is represented by TH=θoffset and is similarly controlled.

Let a position angle change rate of the robot 1 and a control gain for the position angle be VTH and GTH, respectively. Then, a directed value of the position angle change rate for correcting the position angle so that the robot 1 runs on the straight running path 15 is represented by Equation (2).

The drive controller 3 calculates the value of Equation (2) and controls driving amount of each of the left and right wheels 5. The drive controller 3 thereby calculates the directed value of the position angle change rate for correcting the position angle with respect to the straight running path 15, drives the wheels 5 and performs running control of the robot 1.

According to the process described above, the robot 1 can correct its position and position angle (steering angle) so as to move autonomously along the instructed running path R.

[Instructed Running]

The drive controller 3 of the robot 1 is instructed in the running path R, which is instructed running described below.

The instructed running is performed before the robot 1 runs autonomously. While an operator manually directs the robot 1 to run along a path that the operator wants to teach, the drive controller 3 stores in the memory unit, as instructed images, image data obtained by the camera 6 at discrete points (instruction points) arranged on the running path for every particular separation.

In the above arrangement, a distance D2 between adjacent instruction points in the offset running range B2 is set to be smaller than a distance D1 between adjacent instruction points in the normal running range B1. That is, the instruction points are arranged more densely in the offset running range B2 than in the normal running range B1.

As the drive controller 3 performs a feedback control in the offset running range B2 so that the value of TH calculated by Equation (2) equals the target value θoffset corresponding to the offset value d, the instruction points are arranged in the offset running range B2 as described above in order to reduce degradation of accuracy of an actual running path in comparison with a running path offset parallel to the instructed path in a case where the distance D2 between the instruction points is too long.

As the third embodiment is configured as described above, the operator can make the robot 1 run on another running path B2 offset offset by the offset value d against the running path (offset running range B2) instructed in advance in accordance with the offset value d properly entered into the input device of the drive controller 3 without performing instructed running separately. The operator can thereby reduce a workload.

The operator can make the normal running range B1 into an offset running range without performing new instructed running by properly setting the offset value through the input device of the drive controller 3. In that case, the operator can make the robot 1 run autonomously along a new path offset against the already instructed path B1, and can thereby easily set a temporary running path and so on for avoiding an obstacle.

The present invention is not limited to the embodiments described above, and may be variously modified within the scope of the present invention.

The present invention is not limited to the above embodiments, and, e.g., may be properly applied to a vehicle and so on that can move autonomously such as a service robot.

What is claimed is:

1. A robot system comprising:
    a robot having a running subsystem;
    a camera configured to capture a real-time image;
    a distance direction sensor configured to detect a distance between the distance direction sensor and an object and a direction from the distance direction sensor to the object; and
    a controller configured to control the robot and comprising:
        a memory configured to store a plurality of instruction images obtained as targets of the real-time image at each of a plurality of discrete instruction points provided on a predetermined running path;
        an image guidance configured to control the running subsystem based on a comparison result between the real-time image and the instruction image;
        a measurement distance guidance configured to control the running subsystem based on a detection result of the distance direction sensor;
        a switch configured to set one of the image guidance and the measurement distance guidance to be effective to control the running system based on predetermined switching conditions; and
        an extracting device configured to extract an area satisfying a predetermined condition from a pixel arrangement of the real-time image as a distinctive point, the switch being further configured to set the image guidance out of the image guidance and the measurement distance guidance to be effective to control the running system in a case where a number of the distinctive points is equal to or more than a predetermined image guidance beginning number, the switch being further configured to set the measurement distance guidance out of the image guidance and the measurement distance guidance to be effective to control the running system in a case where the number of the distinctive points is less than the predetermined image guidance beginning number.

2. A robot system comprising:
    a robot having a running subsystem;
    a camera configured to capture a real-time image;
    a distance direction sensor configured to detect a distance between the distance direction sensor and an object and a direction from the distance direction sensor to the object; and
    a controller configured to control the robot and comprising:
        a memory configured to store a plurality of instruction images obtained as targets of the real-time image at each of a plurality of discrete instruction points provided on a predetermined running path;
        an image guidance configured to control the running subsystem based on a comparison result between the real-time image and the instruction image;
        a measurement distance guidance configured to control the running subsystem based on a detection result of the distance direction sensor;
        a switch configured to set one of the image guidance and the measurement distance guidance to be effective to control the running system based on predetermined switching conditions; and
        an extracting device configured to extract an area satisfying a predetermined condition from a pixel arrangement of the real-time image as a distinctive point, the switch being further configured to set the measurement distance guidance out of the image guidance and the measurement distance guidance to be effective to control the running system in a case where a number of the distinctive points is equal to or less than a predetermined image guidance beginning number, the switch being further configured to set the image guidance out of the image guidance and the measurement distance guidance to be effective to control the running system in a case where the number of the distinctive points is more than the predetermined image guidance beginning number.

3. The robot system according to claim 1, wherein the switch is further configured to set the measurement distance guidance out of the image guidance and the measurement distance guidance to be effective to control the running system in a case where the comparison result between the real-time image and the instruction image is greater than a threshold.

4. The robot system according to claim 1, wherein the switch is further configured to set the image guidance out of the image guidance and the measurement distance guidance to be effective to control the running system in a case where the comparison result between the real-time image and the instruction image is smaller than a threshold.

5. The robot system according to claim 1, further comprising:
    a planar sign provided along the predetermined running path, the planar sign having a diffusive reflection face for diffusive reflection of light and mirror surface finished portions for mirror reflection of light, wherein
    the controller further comprises
        a map data memory configured to store map data of the predetermined running path including a position of the planar sign, and
        a progress direction determining device configured to compare a detection result of the distance direction sensor and the stored map data so as to determine a progress direction of the robot.

6. The robot system according to claim 5, wherein
    the distance direction sensor is configured to emit light for detection in a substantially horizontal direction, and
    the mirror surface finished portion is inclined by a particular angle with respect to a vertical plane.

7. The robot system according to claim 5, wherein the mirror surface finished portions are provided on both sides of the diffusive reflection face.

8. The robot system according to claim 5, wherein the planar sign is provided at an end of a portion of the predetermined running path on which the robot progresses straight ahead in such a way as to face in a direction opposite to a direction in which the robot progresses straight ahead.

9. The robot system according to claim 5, wherein the planar sign is arranged on a wall forming the predetermined running path.

10. The robot system according to claim 1, wherein the image guidance is further configured to obtain an offset value with respect to the predetermined running path, and to control the running subsystem based on the comparison result between the real-time image and the instruction image, and based on the obtained offset value.

11. The robot system according to claim 10, wherein
    a normal running range and an offset running range are set on the predetermined running path, the robot being configured to autonomously run along the predetermined running path in the normal running range, the robot being configured to autonomously run along a path offset from the predetermined running path in the offset running range, and a distance between the instruction points in the offset running range is smaller than a distance between the instruction points in the normal running range.

12. The robot system according to claim 10 comprising a plurality of the robots.

* * * * *